United States Patent
Artiga Gonzalez et al.

(10) Patent No.: US 6,200,498 B1
(45) Date of Patent: Mar. 13, 2001

(54) PROCESS FOR PRODUCING PARAFFIN-CONTAINING FOAM REGULATORS

(75) Inventors: Rene-Andres Artiga Gonzalez, Duesseldorf; Maria Liphard, Essen; Ingrid Kraus; Stefan Hammelstein, both of Duesseldorf, all of (DE)

(73) Assignee: Henkel Kommanditgesellschaft auf Aktien, Dusseldorf (DE)

( * ) Notice: Subject to any disclaimer, the term of this patent is extended or adjusted under 35 U.S.C. 154(b) by 0 days.

(21) Appl. No.: 09/254,027

(22) PCT Filed: Aug. 29, 1997

(86) PCT No.: PCT/EP97/04714

§ 371 Date: Apr. 7, 1999

§ 102(e) Date: Apr. 7, 1999

(87) PCT Pub. No.: WO98/09701

PCT Pub. Date: Mar. 12, 1998

(51) Int. Cl.$^7$ .................................................. B01D 17/00
(52) U.S. Cl. ......................................... 252/320; 252/358
(58) Field of Search .................... 252/321, 358, 252/320

(56) References Cited

U.S. PATENT DOCUMENTS

| | | | |
|---|---|---|---|
| 4,192,761 | 3/1980 | Peltre et al. | 252/99 |
| 4,845,007 | * 7/1989 | Hyosu | 430/137 |
| 5,002,695 | 3/1991 | Schulz et al. | 252/321 |
| 5,494,488 | 2/1996 | Arnoldi et al. | 8/137 |
| 5,541,316 | 7/1996 | Engelskirchen et al. | 510/471 |
| 5,578,408 | * 11/1996 | Kohtaki | 430/106.6 |
| 5,580,941 | 12/1996 | Krause et al. | 527/300 |
| 5,783,616 | 7/1998 | Krause et al. | 524/58 |

FOREIGN PATENT DOCUMENTS

| | | |
|---|---|---|
| 94 58592 | 8/1994 | (AU) . |
| 20 43 087 | 3/1972 | (DE) . |
| 28 57 155 | 1/1980 | (DE) . |
| 34 36 194 | 4/1986 | (DE) . |
| 42 21 381 | 2/1994 | (DE) . |
| 43 00 772 | 7/1994 | (DE) . |
| 43 03 320 | 8/1994 | (DE) . |
| 44 17 734 | 11/1995 | (DE) . |
| 0 008 829 | 3/1980 | (EP) . |
| 0 075 433 | 3/1983 | (EP) . |
| 0 087 233 | 8/1983 | (EP) . |
| 0 094 250 | 11/1983 | (EP) . |
| 0 309 931 | 4/1989 | (EP) . |
| 0 723 795 | 7/1996 | (EP) . |
| WO92/20770 | 11/1992 | (WO) . |
| WO93/16110 | 8/1993 | (WO) . |
| WO93/17772 | 9/1993 | (WO) . |

OTHER PUBLICATIONS

The Analyst, vol. 87, Mackenzie and Mitchell: Differential Thermal Analysis. A review,(1962), pp. 420–434.
DIN ISO 2207.
Derwent Patent Abstract (WPAT) 92–399896/49.
Derwent Patent Abstract (WPAT) 93/295929/38.
Derwent Patent Abstract (WPAT) 89–101263/14.
Derwent Patent Abstract (WPAT) 79–02332B/02.
Derwent Patent Abstract (WPAT) 86–100950/16.
Derwent Patent Abstract (WPAT) 93–259656/33.
Derwent Patent Abstract (WPAT) 94–035002/04.
Derwent Patent Abstract (WPAT) 94–235530/29.
Derwent Patent Abstract (WPAT) 94–280420/35.
Derwent Patent Abstract (WPAT) 96–000404/01.

* cited by examiner

Primary Examiner—Paul R. Michl
(74) Attorney, Agent, or Firm—Wayne C. Jaeschke; Glenn E. J. Murpjy

(57) ABSTRACT

A process for producing pourable foam regulator granules containing a defoamer combination of a paraffin wax and a bisamide derived from diamines and carboxylic acids and an inorganic, water-soluble or water-dispersible carrier salt by pelletizing in a granulation mixer with intensive mixing 50 to 100 parts by weight of the inorganic carrier salt optionally with up to 5 parts by weight of an anionic or nonionic cellulose ether, adding 1 to 10 parts by weight of an aqueous alkali metal silicate or polymeric polycarboxylate solution and then adding 10 parts by weight of the defoamer combination heated to a temperature of 70° C. to 180° C.

20 Claims, No Drawings

PROCESS FOR PRODUCING PARAFFIN-CONTAINING FOAM REGULATORS

BACKGROUND OF THE INVENTION

1. Field of the Invention

This invention relates to a process for producing pourable foam regulator granules containing inorganic, water-soluble and/or water-dispersible carrier salt and paraffin wax for use in laundry and dishwashing detergents by pelletizing and to the use of the granules thus produced as foam-regulating constituents of laundry and dishwashing detergents.

2. Discussion of Related Art

The use of bisamides as foam regulators for detergents is known from DE-A 20 43 087. However, the formulations mentioned in that document do not have a uniform foam regulator effect over a wide temperature range and show weaknesses, particularly at low washing temperatures. European patent EP 087 233 describes a process for the production of a low-foaming detergent in which mixtures of an oily or wax-like substance and bisamides are applied to a carrier powder, more particularly a spray-dried surfactant-containing detergent. The oily or wax-like substance may consist, for example, of vaseline with a melting point of 20° C. to 120° C. In the Examples, mineral oil is used for this purpose. This component obviously serves primarily as a carrier or dispersant for the bisamide. Although the use of 2% by weight of foam-regulating mixture, based on the detergent, gives satisfactory results in the Ross-Miles Test, these quantities appear far too high for practical purposes. In addition, with this method of formulation, i.e. spraying the foam-regulating mixture onto the spray-dried surfactant-containing detergent, the storage stability of the foam regulating component present exclusively on the surface of the foam regulator is in danger of being impaired by the production process, with the result that its activity decreases with increasing storage time. In order to increase its effect and, at the same time, to reduce the necessary in-use concentration, other known foam inhibitors, particularly polysiloxanes or polysiloxane/silica mixtures, are often added to these foam regulators. However, polysiloxanes, although well-known for their favorable foam-regulating effect, are relatively complicated to produce, which generally makes them more expensive as raw materials than comparable active substances, and in addition have the disadvantage that their biological degradability in the wastewater is often not entirely satisfactory. Other bisamide-containing formulations are known from European patents EP 075 437 and EP 094 250. However, the formulations described in these documents contain silicones. DE-A 28 57 155 describes detergents with a foam regulator which contains hydrophobic silicon dioxide and a mixture of solid and liquid hydrocarbons, optionally in admixture with fatty acid esters. European patent application EP 309 931 describes foam regulators based on a relatively expensive mixture of paraffin wax and microcrystalline paraffin wax. International patent application WO 93/17772 describes paraffin-based foam regulators containing carboxylic acid bisamide of which the paraffin wax component has as small a liquid content as possible and, preferably, contains no liquid at all. According to the document in question, preferred paraffin wax mixtures have a liquid content at 30° C. of less than 10% by weight and a liquid content at 40° C. of less than 30% by weight. In some cases, however, foam regulators of the type in question perform unsatisfactorily in low-temperature machine washing which, recently, has acquired increasing significance.

European patent application EP 0 008 829 describes solid detergents which contain a foam control system of wax, hydrophobicized silica gel, certain nonionic dispersants and, optionally, silicones which is present in the form of an intimate mixture with the other ingredients of the detergent. According to the document in question, the preliquefied foam control system may be sprayed onto preformed, more particularly spray-dried, carrier granules which contain all or part of the other detergent ingredients. The several stages involved in this production process make it relatively complicated.

DE-A 34 36 194 describes a process for the production of pourable foam regulator granules by spray drying of an aqueous dispersion containing water-insoluble foam inhibitor, inorganic carrier salt and certain cellulose ether mixtures. Because of the high temperatures prevailing under the spray-drying conditions, a process such as this can lead to products which do not always show optimal foam-regulating performance, particularly where low-melting paraffin waxes are used.

However, the use of such low-melting paraffins is of particular interest by virtue of their considerable effectiveness in the low-temperature wash programs being increasingly used by the consumer.

Additionally, there was a need to develop a process for the production of stable foam regulator formulations which, in the production of particulate laundry and dishwashing detergents, would withstand mixing with the other ingredients with their granular structure intact and without any dust emission and which, nevertheless, would dissolve quickly and completely and release the foam-inhibiting agent under in-use conditions.

DESCRIPTION OF THE INVENTION

The process according to the invention for producing pourable foam regulator granules containing a defoamer combination of a paraffin wax and a bisamide derived from diamines and carboxylic acids and inorganic, water-soluble and/or water-dispersible carrier salt is characterized in that a pelletizing step is carried out in a granulation mixer by intensively mixing a quantity of 50 to 100 parts by weight and, more particularly, 60 to 85 parts by weight of the inorganic carrier salt, preferably containing alkali metal sulfate and/or alkali metal carbonate, optionally with a quantity of up to 5 parts by weight and, more particularly, 1 to 3 parts by weight of an anionic and/or nonionic cellulose ether, adding a quantity of 1 to 10 parts by weight and, more particularly, 2 to 8 parts by weight of an aqueous alkali metal silicate and/or polymeric polycarboxylate solution while granulation continues and then adding 10 parts by weight of the defoamer combination heated to a temperature of 70° C. to 180° C. In a preferred embodiment, 5 to 20 parts by weight and, more particularly, 7 to 15 parts by weight of water or an aqueous sodium silicate and/or polymeric polycarboxylate solution are added after the defoamer combination. In these cases, the granules obtained have a particularly stable structure. It is remarkable that, where this procedure is adopted, the carrier material does not have to heated and, instead, can be left at ambient temperature or at the temperature generated by the energy introduced through the mixing process.

In another preferred embodiment of the process according to the invention, the preferably phosphate-free carrier salt mixture is homogenized, optionally after addition of the cellulose ether mixture, for 5 seconds to 30 seconds, more particularly in an intensive mixer, for example an FS30

Fukae® an Eirich® mixer, a Lödige® plowshare mixer or a Shugi® mixer, the aqueous alkali metal silicate solution is added as quickly as possible, the liquid molten defoamer combination is then introduced, after which the water or the aqueous alkali metal silicate and/or polycarboxylate solution, if any, is added over a period of 10 seconds to 30 seconds and the granulation process is continued for 10 seconds to 10 minutes. The ingredients used in liquid form can be introduced through the spray nozzles normally present in granulation mixers.

The defoamer combination preferably consists of 70% by weight to 95% by weight of paraffin wax or paraffin wax mixture and of 5% by weight to 30% by weight of a bisamide derived from $C_{2-7}$ diamines and saturated $C_{12-22}$ carboxylic acids. The paraffin wax is solid at room temperature, at least 35% by weight and, more particularly, at least 45% by weight and less than 100% by weight preferably being present in liquid form at a temperature of 40° C.

The paraffin wax present in the defoamer combination is generally a complex mixture with no clear-cut melting point. It is normally characterized by determining its melting range by differential thermoanalysis (DTA), as described in "The Analyst" 87 (1962), 420, and/or its solidification point. This is understood to be the temperature at which the wax changes from the liquid to the solid state by gradual cooling. Paraffins containing less than 17 carbon atoms cannot be used for the purposes of the invention so that their percentage content in the paraffin wax mixture should be as small as possible and, preferably, is below the limit significantly measurable by standard analytical techniques, for example gas chromatography. Waxes which solidify at 20° C. to 70° C. are preferably used. It is important in this regard to bear in mind the fact that even paraffin wax mixtures which appear solid at room temperature can contain varying proportions of liquid paraffin. In the paraffin waxes suitable for use in accordance with the invention, the liquid component at 40° C. is as large as possible without ever reaching 100% at that temperature. Preferred paraffin wax mixtures have a liquid component at 40° C. of at least 50% by weight and, more particularly, between 55% by weight and 80% by weight and a liquid component at 60° C. of at least 90% by weight. The result of this is that the paraffins are free-flowing and pumpable at temperatures down to at least 70° C. and preferably down to at least 60° C. In addition, it is important to bear in mind that the paraffins should not contain any volatile components. Preferred paraffin waxes contain less than 1% by weight and, more particularly, less than 0.5% by weight of components capable of evaporating at 110° C./normal pressure. Paraffin waxes suitable for use in accordance with the invention can be obtained, for example, under the trade names of Lunaflex® from the Fuller company and Deawax® from DEA Mineralöl AG.

The second component of the defoamer combination consists of bisamides derived from saturated $C_{12-22}$ and, more particularly $C_{14-18}$ fatty acids and $C_{2-7}$ alkylene diamines. Suitable fatty acids include, for example, lauric acid, myristic acid, stearic acid, arachic acid and behenic acid and the mixtures thereof obtainable from natural fats or hydrogenated oils, such as tallow or hydrogenated palm oil. Suitable diamines are, for example, ethylenediamine, 1,3-propylenediamine, tetramethylenediamine, pentamethylenediamine, hexamethylenediamine, p-phenylenediamine and toluylenediamine. Preferred diamines are ethylenediamine and hexamethylenediamine. Particularly preferred bisamides are bis-myristoyl ethylenediamine, bis-palmitoyl ethylenediamine, bis-stearoyl ethylenediamine and mixtures thereof and the corresponding derivatives of hexamethylenediamine.

As described in European patent application EP 0 309 931, the bisamides are preferably present in fine-particle form and, in particular, have a mean particle size of less than 50 µm. The maximum size of the particles is preferably below 20 µm, at least 50% and, more particularly, at least 75% of the particles being smaller than 10 µm.

The defoamer combination may be produced by introducing the fine-particle bisamide into a melt of the paraffin wax and homogenizing it therein by intensive mixing. To this end, the melt should have a temperature of at least 90° C. and at most 200° C. The temperature at which the paraffin wax is kept in order to apply it to the carrier material is preferably in the range from 100° C. to 150° C. The presence of a stable dispersion of the bisamide particles in the paraffin matrix, which is crucial to the effectiveness of the foam regulator, can be achieved through a particle size corresponding to the above definition. In order to achieve this dispersion state, a bisamide having the appropriate particle size from the outset may be used and dispersed or a coarser starting material may be used and the melt subjected to intensive stirring or grinding in colloid mills, toothed disc mills or ball mills until the required particle size has been reached. Complete melting of the bisamides in the paraffin melt and subsequent cooling to temperatures below their solidification point by application to the colder carrier material can also lead to a correspondingly fine particle size distribution of the bisamides.

The preferably phosphate-free carrier salt mixture for the defoamer combination contains readily water-soluble inorganic salts such as, for example, alkali metal sulfates, alkali metal carbonates and/or alkali metal silicates. In one preferred embodiment of the invention, it contains both alkali metal carbonate and alkali metal sulfate, the alkali metal sulfate in particular being responsible for the good dissolving properties of the granules according to the invention. The carrier material may additionally contain other water-soluble or water-insoluble, water-dispersible substances. Suitable additional carrier materials include in particular alkali metal chlorides, alkaline earth metal silicates, alumosilicates, for example zeolite A, P and X and layer silicates, for example bentonite. The carrier salt mixture preferably contains no more than 20% by weight and, more particularly, from 1% by weight to 15% by weight, based on the final granules, of the additional carrier materials.

Cellulose ethers suitable for use in accordance with the invention include, in particular, alkali metal carboxymethyl cellulose, methyl cellulose, ethyl cellulose, hydroxyethyl cellulose and so-called cellulose mixed ethers such as, for example, methyl hydroxyethyl cellulose and methyl hydroxypropyl cellulose and mixtures thereof. Mixtures of sodium carboxymethyl cellulose and methyl cellulose in which the carboxymethyl cellulose normally has a degree of substitution of 0.5 to 0.8 carboxymethyl groups per anhydroglucose unit and the methyl cellulose a degree of substitution of 1.2 to 2 methyl groups per anhydroglucose unit are preferably used. Cellulose ethers such as these are normally used in solid form in the process according to the invention, although they may also be used in the form of aqueous solutions which may be preswollen in the usual way. Cellulose ether mixtures preferably contain alkali metal carboxymethyl cellulose and nonionic cellulose ether in ratios by weight of 80:20 to 40:60 and, more particularly, 75:25 to 50:50.

The alkali metal silicate usable in the carrier material both in solid form and in the form of the aqueous solution mentioned is preferably a sodium sililicate with a molar Na$_2$O to SiO$_2$ ratio of 1:2 to 1:3.35. The use of such silicates results in particularly favorable granule properties, more particularly high abrasion resistance and a high dissolving rate in water. The aqueous alkali metal silicate solution, if used, preferably contains 25% by weight to 60% by weight and, more particularly, 30% by weight to 40% by weight of alkali metal silicate.

The polymeric polycarboxylates optionally used include in particular the polycarboxylates of International patent application WO 93/16110 obtainable by oxidation of polysaccharides and polymeric acrylic acids, methacrylic acids, maleic acids and copolymers thereof which may also contain small amounts of polymerizable substances with no carboxylic acid functionality in copolymerized form. The relative molecular weight of the homopolymers of unsaturated carboxylic acids is generally in the range from 5,000 to 200,000 and that of the copolymers in the range from 2,000 to 200,000 and preferably in the range from 50,000 to 120,000, based on free acid. A particularly preferred acrylic acid/maleic acid copolymer has a relative molecular weight of 50,000 to 100,000. Suitable but less preferred compounds of this class are copolymers of acrylic acid or methacrylic acid with vinyl ethers, such as vinyl methyl ethers, vinyl ester, ethylene, propylene and styrene, in which the acid makes up at least 50% by weight. Terpolymers containing two unsaturated acids and/or salts thereof as monomers and vinyl alcohol and/or a vinyl alcohol derivative or a carbohydrate as the third monomer may also be used. The first acidic monomer or its salt is derived from a monoethylenically unsaturated C$_{3-8}$ carboxylic acid and preferably from a C$_{3-4}$ monocarboxylic acid, particularly (meth)acrylic acid. The second acidic monomer or its salt may be a derivative of a C$_{4-8}$ dicarboxylic acid, maleic acid being particularly preferred. In this case, the third monomeric unit is formed by vinyl alcohol and/or preferably an esterified vinyl alcohol. Vinyl alcohol derivatives in the form of an ester of short-chain carboxylic acids, for example C$_{1-4}$ carboxylic acids, with vinyl alcohol are particularly preferred. Preferred polymers contain 60% by weight to 95% by weight and, more particularly, 70% by weight to 90% by weight of (meth)acrylic acid or (meth)acrylate, preferably acrylic acid or acrylate, and maleic acid or maleate and 5% by weight to 40% by weight and preferably 10% by weight to 30% by weight of vinyl alcohol and/or vinyl acetate. Polymers in which the ratio by weight of (meth)acrylic acid or (meth)acrylate to maleic acid or maleate is between 1:1 and 4:1, preferably between 2:1 and 3:1 and more particularly between 2:1 and 2.5:1 are most particularly preferred (both the quantities shown and the ratios by weight apply to the acids). The second acidic monomer or its salt may even be a derivative of an allyl sulfonic acid which is substituted in the 2-position by an alkyl group, preferably a C$_{1-4}$ alkyl group, or an aromatic radical preferably derived from benzene or benzene derivatives. Preferred terpolymers contain 40% by weight to 60% by weight and, more particularly, 45% by weight to 55% by weight of (meth)acrylic acid or (meth)acrylate, preferably acrylic acid or acrylate, 10% by weight to 30% by weight and preferably 15% by weight to 25% by weight of methallyl sulfonic acid or methallyl sulfonate and, as the third monomer, 15% by weight to 40% by weight and preferably 20% by weight to 40% by weight of a carbohydrate. This carbohydrate may be, for example, a monosaccharide, disaccharide, oligosaccharide or polysaccharide, mono-, di- or oligosaccharides being preferred. Sucrose is particularly preferred. The use of the third monomer presumably introduces predetermined weak spots into the polymer which are responsible for its ready biodegradability. These terpolymers may be produced in particular by the processes described in German patent DE 42 21 381 and in German patent application DE 43 00 772 and generally have a relative molecular weight of 1,000 to 200,000, preferably in the range from 200 to 50,000 and more preferably in the range from 3,000 to 10,000. Other preferred copolymers are the copolymers described in German patent applications DE 43 03 320 and DE 44 17 734 which preferably contain acrolein and acrylic acid/acrylic acid salts or vinyl acetate as monomers. The polymeric polycarboxylates are preferably used in the form of 30 to 50% by weight aqueous solutions. All the acids mentioned are generally used in the form of their water-soluble salts, more particularly their alkali metal salts.

The foam regulator granules obtainable by the process according to the invention, which are suitable for use in laundry or dishwashing detergents, preferably contain 60% by weight to 90% by weight of inorganic carrier salt or carrier salt mixture, 0.5% by weight to 5% by weight of a mixture of alkali metal carboxymethyl cellulose and nonionic cellulose ether, more particularly in a ratio by weight of 80:20 to 40:60, 5% by weight to 30% by weight and, more particularly, 8% by weight to 20% by weight of defoamer combination, 0.5% by weight to 10% by weight and, more particularly, 1% by weight to 5% by weight of alkali metal silicate, 0.5% by weight to 10% by weight and, more particularly, 1% by weight to 5% by weight of polymeric polycarboxylate and up to 15% by weight and, more particularly, 2% by weight to 10% by weight of water. A water content in the above-mentioned range is normally established automatically if the process parameters according to the invention are observed. If their water content is too high, however, foam regulator granules produced in accordance with the invention may also be dried by conventional methods, for example in fluidized bed dryers, after the pelletizing steps.

Foam regulators produced in accordance with the invention are preferably free from surfactants with an emulsifying or dispersing effect. Surfactants are understood to be surface-active compounds of which part of the molecule is hydrophobic and which contain hydrophilic anionic, ampholytic, zwitterionic, cationic and nonionic groups. They develop a cleaning or emulsifying effect in the form of an aqueous solution or dispersion. The hydrophobic part of the molecule generally consists of a hydrocarbon radical or a substituted hydrocarbon radical or a substantially water-insoluble polyglycol ether group, for example a polypropylene glycol or polybutylene glycol ether group. Compounds with a non-polar molecular structure, more particularly the above-mentioned cellulose ethers or polymeric polycarboxylates, which can also develop a dispersing effect in water under certain conditions, do not come under the definition of "surfactants" and may be present.

The foam regulator granules according to the invention normally have bulk densities of 600 grams per liter to 1400 grams per liter and, more particularly, 800 grams per liter to 1200 grams per liter. In general, more than 80% by weight, preferably more than 90% by weight and, in particular, more than 95% by weight of the granules have particle sizes of 0.1 mm to 2.0 mm. In one preferred embodiment, the average particle size of the foam inhibitor granules is in the range from 0.4 mm to 0.8 mm. In a particularly preferred embodiment, only very small percentages of the granules have particle sizes outside this range.

The foam regulator granules obtainable by the process according to the invention are stable in storage, can readily be mixed with typical powder-form ingredients of laundry and dishwashing detergents without any dust emission and are completely flushed into washing machines with no residues. Accordingly, the present invention also relates to their use as foam-regulating components of laundry and dishwashing detergents. They dissolve quickly at temperatures below 60° C. and, accordingly, release the foam-inhibiting agent even under low-temperature washing conditions or even in the initial phase of high-temperature washing, their foam-regulating performance remaining at a consistently high level throughout the wash cycle.

The foam regulator granules according to the invention are also distinguished in particular by the fact that, in contrast to spray-dried formulations, the active foam-regulating agent develops a high level of activity in the final particles. The granules according to the invention have a foam-regulating performance which spray-dried products of similar composition only achieve with larger contents of active substance.

EXAMPLES

Example 1

In a 135 liter Lödige® plowshare mixer, 16.2 kg of sodium sulfate and 0.5 kg of a mixture of sodium carboxymethyl cellulose and methyl cellulose (ratio by weight about 70:30) containing 66% by weight of active substance (rest sodium chloride and sodium glycolate) were homogenized for 15 seconds with the chopping unit switched on. 0.5 kg of a 34% by weight aqueous sodium silicate solution and then 0.7 kg of an aqueous 34% by weight solution of polymeric polycarboxylate were introduced over a period of 15 seconds. 2 kg of a melt heated to 150° C. of 88% by weight of paraffin (solidification point according to DIN ISO 2207 45° C., liquid content ca. 66% by weight at 40° C. and ca. 96% at 60° C.) and 12% by weight of ethylenediamine bis-stearoyl amide were then sprayed in over a period of 180 seconds. 1.6 kg of water was then added over a period of 30 seconds, followed by mixing for 120 seconds. The moist granules were then dried at 80° C. in a fluidized-bed dryer. Hard, dry free-flowing foam regulator granules G1 with a bulk density of 1200 grams per liter were obtained, 98% by weight consisting of particles larger than 0.1 mm in size and 60% by weight consisting of particles between 0.8 mm and 2.0 mm in size.

Example 2

Detergents were produced simply by mixing quantities of 1.5% by weight of foam regulator granules B1 and C1 with a standard heavy-duty detergent powder containing 21% by weight of zeolite NaA, 20% by weight of sodium sulfate, 3% by weight of sodium silicate, 10% by weight of sodium carbonate, 3.5% by weight of polymeric polycarboxylate (Sokalan® CP5), 8% by weight of sodium alkyl benzene sulfonate, 2% by weight of nonionic surfactant, 1.5% by weight of soap, 22% by weight of sodium perborate and 2% by weight of TAED, balance to 100% by weight water. It was shown by washing tests (Miele® W918 drum-type washing machine, 3.5 kg clean washing, water hardness 3°d, dosage 130 g detergent) that the foam regulators according to the invention are more effective, particularly at low temperatures, than a known foam regulator tested for comparison (C1) which contained the same ingredients as B1, but which had been produced by spray drying and which therefore had to contain a more heat-resistant and higher-melting paraffin (liquid content ca. 9% by weight at 40° C., ca. 66% at 60° C.). The foam scores shown in Table 2 below were obtained (scale of 0 to 6:0=no foam; 3=bull's eye of washing machine half-filled with foam; 5=bull's eye of washing machine completely filled with foam; 6=loss of liquor through overfoaming; the values were read off after the specified washing time for the 40° C. program and in the specified temperature range for the 90° C. program). After storage (8 weeks in laminated boxes at 30° C./80% relative air humidity) of the detergent containing the foam regulator granules B1 according to the invention, there was no sign of any deterioration in the foam-regulating performance.

TABLE 2

Foam scores of the foam regulators in the detergent

| Foam regu- | 40° C. | | | 90° C. | | |
|---|---|---|---|---|---|---|
| lator | <20 mins. | <40 mins. | >40 mins. | <55° C. | <75° C. | >75° C. |
| B1 | 0–1 | 0–2 | 0–2 | 0–1 | 0–2.5 | 2.0–3.5 |
| C1 | >4 | >4 | >4 | >4 | >4 | >4 |

What is claimed is:

1. The process of producing pourable foam regulator granules containing a defoamer combination of a paraffin wax and a bisamide derived from diamines and carboxylic acids and inorganic, water-soluble or water-dispersible carrier salt, comprising pelletizing in a granulation mixer by intensively mixing 50 to 100 parts by weight of said inorganic carrier salt, optionally with up to 5 parts by weight of an anionic or nonionic cellulose ether, adding 1 to 10 parts by weight of an aqueous alkali metal silicate or polymeric polycarboxylate solution, and then adding 10 parts by weight of said defoamer combination heated to a temperature of 70° C. to 180° C.

2. A process as in claim 1 including adding 5 to 20 parts by weight of water, or an aqueous sodium silicate solution or a polymeric polycarboxylate solution to said granules after adding said defoamer combination.

3. A process as in claim 1 wherein 60 to 85 parts by weight of said inorganic carrier salt, 1 to 3 parts by weight of cellulose ether and 2 to 8 parts by weight of said aqueous alkali metal silicate or organic polycarboxylate solution are used.

4. A process as in claim 2 wherein said carrier salt is homogenized, optionally after addition of said cellulose ether, for 5 seconds to 30 seconds, adding said water, said aqueous alkali metal silicate solution or polycarboxylate solution, adding said defoamer combination in molten form over a period of 10 seconds to 30 seconds, and granulating the mixture for 10 seconds to 10 minutes.

5. A process as in claim 1 wherein said defoamer composition consists of 70% to 95% by weight of paraffin wax and 5% to 30% by weight of a bisamide derived from $C_2$–$C_7$ diamines and saturated $C_{12}$–$C_{22}$ carboxylic acids.

6. A process as in claim 5 wherein said paraffin wax is a solid at room temperature, and at least 50% by weight, and less than 100% by weight thereof is present in liquid form at a temperature of 40° C.

7. A process as in claim 1 wherein said polymeric polycarboxylate is selected from the group consisting of polycarboxylates obtained by oxidation of polysaccharides and polymeric acrylic acids, methacrylic acids, maleic acids and copolymers thereof which may also contain small quantities of polymerizable substances having no carboxylic acid functionality in copolymerized form.

8. A process as in claim 1, wherein said polymeric polycarboxylate is selected from the group consisting of terpolymers and quaterpolymers which contain two unsaturated acids and salts thereof as monomers and vinyl alcohol or a vinyl alcohol derivative or a carbohydrate as the third or fourth monomer.

9. A process in claim 1 wherein said cellulose ether is selected from the group consisting of alkali metal carboxymethyl cellulose, methyl cellulose, ethyl cellulose, hydroxyethyl cellulose and cellulose mixed ethers such as methyl hydroxyethyl cellulose and methyl hydroxypropylcellulose, and mixtures thereof.

10. Foam regulator granules produced by the process of claim 1 containing 60% to 90% by weight of inorganic carrier salt or carrier salt mixture, 0.5% to 5% by weight of a mixture of alkali metal carboxymethyl cellulose and nonionic cellulose ether in a ratio by weight of 80:20 to 40:60, 5% to 30% by weight of the defoamer combination, 0.5% to 10% by weight of alkali metal silicate, 0.5% to 10% by weight of polymeric polycarboxylate, and up to 15% by weight of water.

11. Foam regulator granules as in claim 10 having a bulk density of 600 grams per liter to 1400 grams per liter.

12. Foam regulator granules as in claim 10 wherein more than 80% by weight of the granules have a particle size of 0.1 mm to 2.0 mm.

13. Foam regulator granules as in claim 12 having a mean particle size in the range from 0.4 mm to 0.8 mm.

14. The process of controlling foam generated from a laundry or dishwashing detergent solution comprising adding to said solution pourable foam regulator granules containing a defoamer combination of a paraffin wax and a bisamide derived from diamines and carboxylic acids and inorganic, water-soluble or water-dispersible carrier salt, said granules having been obtained by pelletizing in a granulation mixer by intensively mixing 50 to 100 parts by weight of said inorganic carrier salt, optionally with up to 5 parts by weight of an anionic or nonionic cellulose ether, adding 1 to 10 parts by weight of an aqueous alkali metal silicate or polymeric polycarboxylate solution, and then adding 10 parts by weight of said defoamer combination heated to a temperature of 70° C. to 180° C.

15. A process as in claim 14 wherein to said granules is added 5 to 20 parts by weight of water, or an aqueous sodium silicate solution or a polymeric polycarboxylate solution after adding said defoamer combination.

16. A process as in claim 14 wherein said granules contain 60 to 85 parts by weight of said inorganic carrier salt, 1 to 3 parts by weight of cellulose ether and 2 to 8 parts by weight of said aqueous alkali metal silicate or organic polycarboxylate solution.

17. A process as in claim 14 wherein said granules have been prepared by homogenizing said carrier salt, optionally after addition of said cellulose ether, for 5 seconds to 30 seconds, adding said water, said aqueous alkali metal silicate solution or polycarboxylate solution, adding said defoamer combination in molten form over a period of 10 seconds to 30 seconds, and granulating the mixture for 10 seconds to 10 minutes.

18. A process as in claim 14 wherein said defoamer composition consists of 70% to 95% by weight of paraffin wax and 5% to 30% by weight of a bisamide derived from $C_2$–$C_7$ diamines and saturated $C_{12}$–$C_{22}$ carboxylic acids.

19. A process as in claim 18 wherein said paraffin wax is a solid at room temperature, and at least 35% by weight and less than 100% by weight thereof is present in liquid form at a temperature of 40° C.

20. A process as in claim 14 wherein said polymeric polycarboxylate is selected from the group consisting of polycarboxylates obtained by oxidation of polysaccharides and polymeric acrylic acids, methacrylic acids, maleic acids and copolymers thereof which may also contain small quantities of polymerizable substances having no carboxylic acid functionality in copolymerized form.

* * * * *